May 24, 1927.
A. E. STOCKFORD
1,629,597
HEAVY DUTY TRAILER FOR TRUCKS
Filed Aug. 7, 1926
2 Sheets-Sheet 1
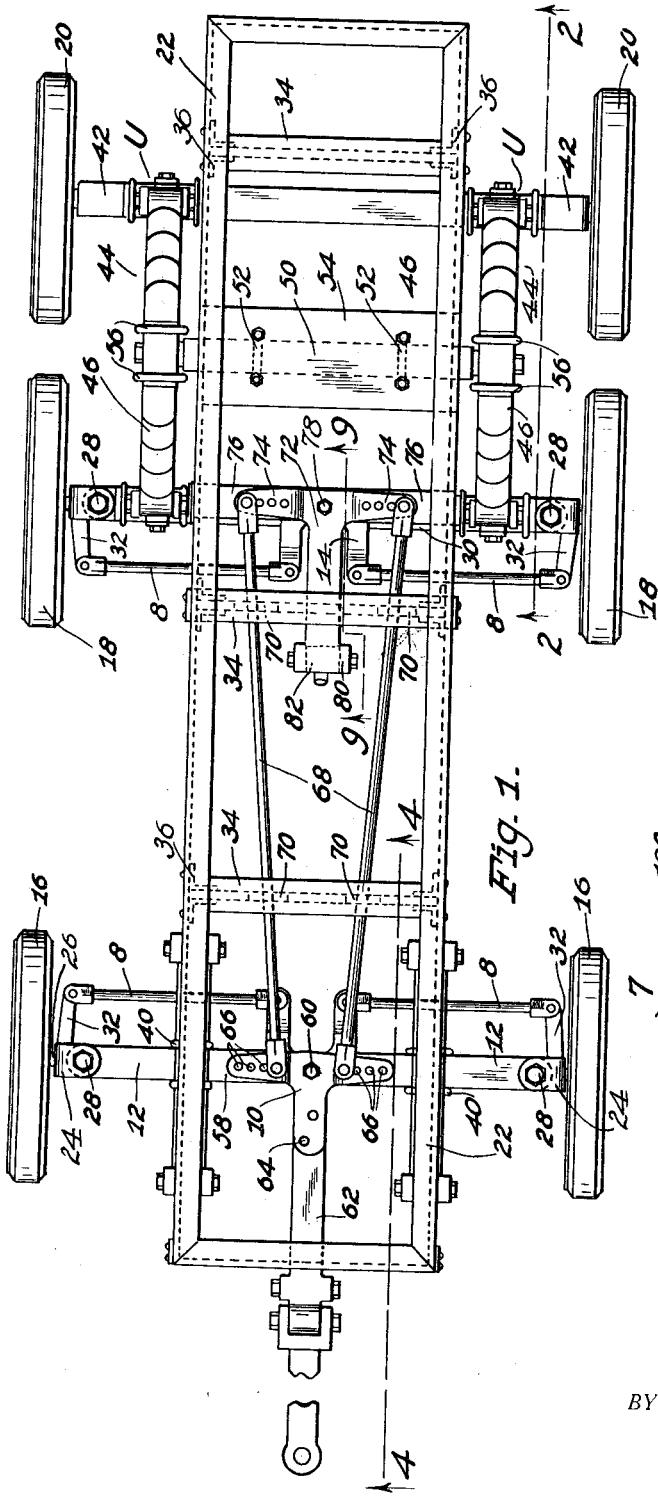
INVENTOR.
*A. E. STOCKFORD*
BY
ATTORNEY.

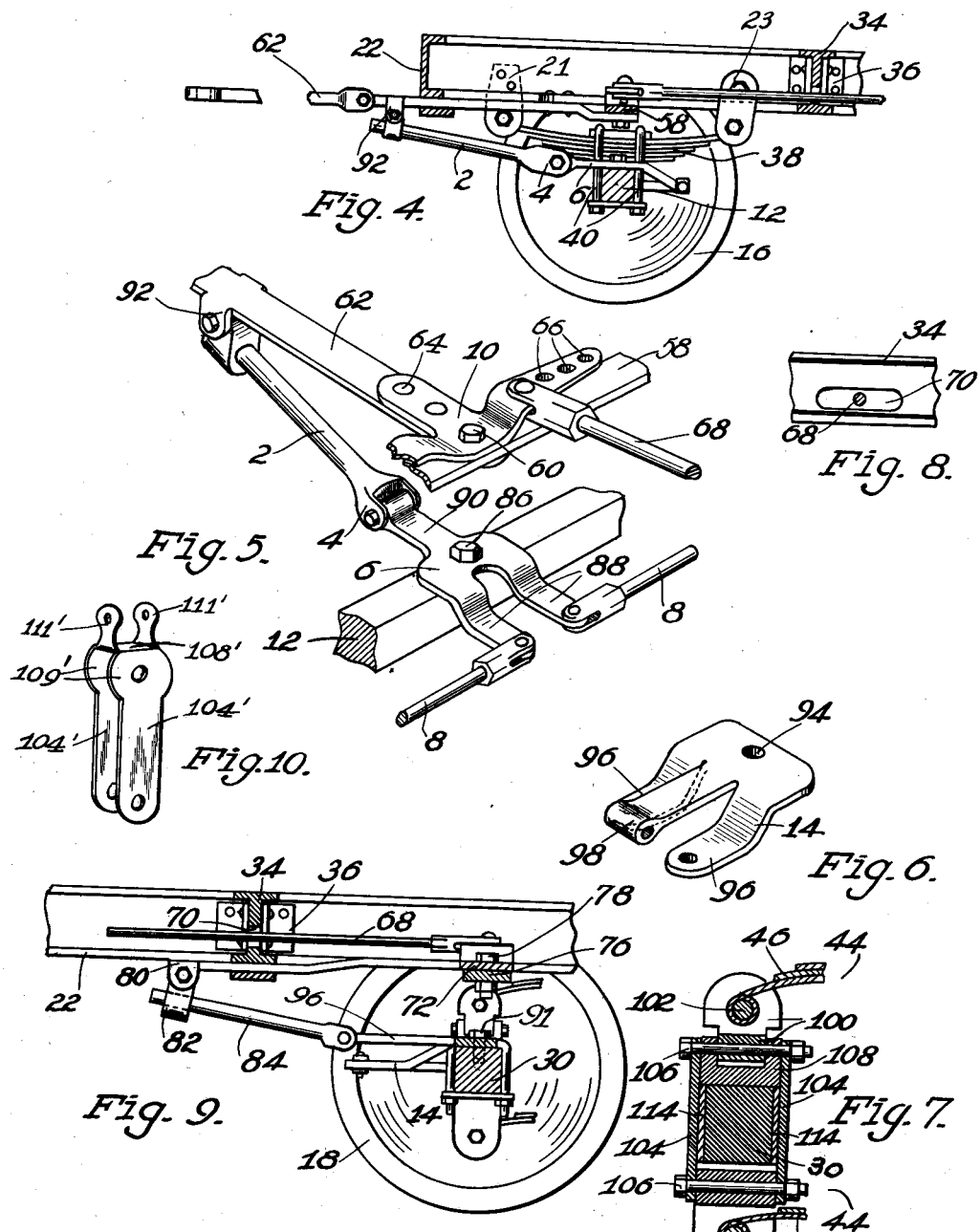

Patented May 24, 1927.

1,629,597

UNITED STATES PATENT OFFICE.

ALEXANDER E. STOCKFORD, OF LOS ANGELES, CALIFORNIA.

HEAVY-DUTY TRAILER FOR TRUCKS.

Application filed August 7, 1926. Serial No. 127,749.

My invention relates to vehicles, and more particularly to trailers adapted for use in connection with heavy duty trucks, whereby the load on said trailer may be continually held in a level condition, irrespective of the condition of road travel, it being difficult to injure the springs, tires and other parts of the vehicle, or upset the load, especially when making a turn in the roadway at high speed, or when one or more of said wheels encounter chuck holes, which is a frequent occurrence with the constructions heretofore proposed.

It accordingly is an object of my invention to provide a novel form of trailer construction, preferably of the six wheel type, said trailer having a framework of preferred channel iron construction, reinforced by cross bars, cross shafts and I beams of any desired number, the wheels of said trailer having associated therewith flexible means in the shape of sets of springs, preferably of leaf form, which springs are connected by means of a set of novel universal joints to the running gear so that said springs will not be subjected to undue twisting action due to road travel, the front wheels being adapted to be turned in unison with the intermediate wheels but through the arc of a circle of smaller diameter, a novel form of adjustable means being provided for this purpose.

It is also an object of my invention to provide a novel form of vehicle or trailer which is simple in form, easy and inexpensive to manufacture, composed of a minimum number of parts, not easy to get out of order, and one which will thoroughly and reliably effect the objects intended.
Further objects and advantages of my invention will become more apparent as the description thereof proceeds.

Reference is had to the accompanying drawings, in which similar reference characters denote similar parts. In the drawings, Fig. 1 is a top plan view of my invention, Fig. 2 is a cross-sectional view on the line 2—2, Fig. 1, looking in the direction of the arrows, Fig. 3 is a detail perspective view of the universal joint used for connecting the springs with the axles of the trailer, Fig. 4 is a cross-sectional view on the line 4—4, Fig. 1,

Fig. 5 is a fragmentary detail perspective view of part of the front wheel construction, Fig. 6 is an enlarged perspective view of the lower yoke associated with the rear wheel construction,

Fig. 7 is an enlarged cross-sectional view on the line 7—7, Fig. 3,

Fig. 8 is a fragmentary detail view,

Fig. 9 is an enlarged cross-sectional view on the line 9—9, Fig. 1, and

Fig. 10 is a perspective view of a modified form of framework for the universal joint.

Describing my invention more in detail, it is my main object to produce a novel form of heavy duty truck trailer so constructed that notwithstanding the roughness or uneven condition of the road, the load on said trailer will always be level, even when one or more wheels enters a chuck hole or encounters an obstruction.

As depicted in the drawings, I provide my trailer with six wheels, the front pair being designated by the reference character 16, the intermediate 18, and the rear wheels 20, said wheels being positioned on axles associated with a framework 22, preferably of channel iron form, as shown more particularly in Fig. 4. It will of course be understood that said framework may be constructed in any manner in practice found desirable.

It has been found in practice that in the trailer constructions heretofore proposed, due to their rough and careless usage, or even when making a turn in the road, the springs with which the framework is associated become twisted, and frequently both wheels and tires are torn from their mountings. By the use of my invention these mishaps are effectively prevented, my novel form of trailer being especially constructed to this end.

As shown in Figs. 1 and 4, the wheels 16 are mounted on the front axle 12, being hinged or pivoted thereto by means of the yoke construction 24 equipped with the wheel journal 26, upon which the wheels are mounted, similarly to the construction on the intermediate axle which is seen in Fig. 3, a pin, bolt, or other pivoting device 28 being used to mount the yoke 24 on the axle 12. A similar construction is used for mounting the intermediate wheels 18 on the intermediate axle 30. The yoke 24 is also provided with an operating arm 32 to which the tie rod 8 is pivoted. It will of course be understood that any other means for turning the wheels 16 and 18 in unison on the axles 12 and 30 may be substituted for that just described.

The framework 22 may be secured together in any manner proposed, by welding, bolting or securing the parts together by means of angle irons and bolts. To brace the parts, I preferably provide any desired number of I beams 34, secured to the framework 22 by means of angle irons 36, or otherwise.

For the purpose of flexibly associating the wheels 16 with the framework 22, I provide a set of front springs 38, preferably of leaf form, as shown in Fig. 4, said springs being secured to the axle 12 by means of the U-bolt, nut and plate construction 40, each end of said springs being secured to the framework 22 by means of the rigid construction 21, by any desired means, and pivoted to said framework by means of the swinging plate 23, said means being of conventional construction.

The rear wheels 20 are mounted upon an axle 42, associated with the rear spring construction, designated generally by the reference character 44, which construction comprises upper and lower sets of leaf springs, 46 and 48 respectively, and more particularly shown in Fig. 2, each end of said springs being connected in any preferred manner with one of the universal joints U, presently to be described in detail.

As shown more particularly in Figs. 1 and 2, a cross shaft or other stationary member 50, its ends reduced as shown, if desired, is secured in any preferred manner as by means of bolts 52, of U form or otherwise, to a plate or other crosspiece 54, welded or bolted or otherwise associated with the framework 22.

If desired, the upper and lower springs 46 and 48 may be held together at the middle by a plate and U-bolt construction 56, or any other preferred construction may be used.

The construction for moving the front and intermediate wheels in unison will now be described. As seen more particularly in Fig. 1, this construction for both sets of wheels is practically identical, and is identical as far as the pivoted or hinged wheels and tie rods are concerned.

In the front wheel construction, a T-shaped plate 10, is pivoted by a bolt or other means 60, to a cross bar, I beam or other bracing means 58, secured to the framework 22 in any preferred manner, which plate 10 is bolted or otherwise fastened to the draw bar 62, as indicated at 64, and is also equipped with an adjusting means in the shape of a set of holes 66 to accommodate the bolts of the tie rods 68. The tie rods 68 pass through an I beam or cross-bar 34 equipped with holes 70 of elliptical form so that a transverse movement of said rods is permitted, a similar T-shaped plate 72 provided with holes 74 being pivotally mounted on the cross bar or cross shaft 76 secured to the framework 22, a bolt or other pivoting means 78 being provided for this purpose. See Fig. 9. The plate 72 has an extension 80 which has associated therewith in any preferred manner a bearing 82 for the purpose of receiving the rod 84 secured to the lower plate 14, similar to the plate 6 secured by means of the bolt 86 to the front axle 12.

The lower plate 6 is bifurcated to form two arms 88, to which the tie rods 8 are secured in any desired manner, and at its front portion is provided with an extension 90 to which the rod 2 is pivoted by the yoke means 4, the front portion of said rod being secured to the draw bar 62 by means of the bolt and hanger construction 92. See more particularly Figs. 4 and 5. It will be understood, however, that this construction is suggestive merely and may in practice be changed as desired and still remain within the province of my invention.

The lower rear plate is shown more particularly in Figs. 6 and 9, and is indicated at 14, said plate being secured to the axle 30 by means of the bolt or other means 91, positioned in the hole 94, the arms 96 being connected to the rear tie rods 8. See Fig. 1. The lower rod 84, similar to the lower front rod 2, is bolted or otherwise secured to the tongue 98, said rod 84 being supported by means of the hanger construction 80, 82 to the framework 22, as seen more particularly in Fig. 9.

The double universal joint U will now be described. See more particularly Figs. 3 and 7. This joint comprises a pair of upper and lower U-shaped members 100, reversely positioned, and adapted to receive the ends of the springs 44, a pair of bolts 102 being used for this purpose. The members 100 are secured to the axle 30, preferably by means of side plates 104, bolts 106, passing through the members 100, being used to secure said plates to said members.

Securely positioned on the top of the axle 30, are the female portions 108 of the joint U, which portions have a base 110 held to the axle 30 by means of the U bolts 112, wear plates 114, preferably countersunk in the axle 30, being provided, which wear plates, as well as the plates 104 may be replaced from time to time as needed.

It will of course be understood that differently shaped axles may be used, the female members 108 being suitably modified, such, for example, being curved or otherwise shaped to fit the particular form of axle used. The universal joint just described is of course used on each end of each spring.

In the form of my invention depicted in Fig. 10, it is possible to omit a number of bushings by the integral framework shown, and accordingly simplify materially the construction of the universal joint, the side pieces 104' being integral with a crosspiece 108' having two upstanding pieces 111' to receive the bolt 106 of the piece 100 passed through the end of the spring, such as shown in the other form of my invention. If desired, the side pieces 104' may have enlarged portions 109' to form bearing surfaces for the axles. This construction may be forged, cast, or bent to shape or otherwise constructed as in practice desired.

In operation, when the trailer turns a corner or is swung around a corner of the road, the draw bar 62, pivoted at 60, and secured to the plate 6, moves the tie rods 8 to swing the wheels 16 in unison. At the same time the tie rods 68 swing the plate 72, simultaneously with the lower plate 14 and rear tie rods 8 to turn the wheels 18 in unison, the front wheels 16, as seen in Fig. 1, swinging on the arc of a circle of a smaller diameter than the rear wheels 18. These arcs may of course be adjusted by means of the holes 66 and 74. This construction prevents skidding or sliding when the truck is turning a corner or a curve in the road.

The universal joints U permit a flexibility toward and away from the framework 22, and prevent the springs from twisting, and the load on the trailer from tipping or tilting forwardly or backwardly, said load being constantly held level, irrespective of the position of one or more of the wheels, and whether said wheels are raised or lowered, depending upon road conditions.

It will also be clear that by reason of the novel mounting of the wheels associated with the springs, no matter what position said wheels are in, either elevated or depressed or tilted side ways, by reason of the character of the roadway, the load on the trailer is always equalized.

While I have thus described my invention with great particularity, it will be clear that the same 'may be modified throughout a wide range. I accordingly do not propose to be limited to the exact details of construction shown and described, but reserve the right in practice to make any and all modifications thereof that fall within the scope of the appended claims.

I claim as my invention:

1. In a heavy duty trailer for trucks, in combination, a channel iron framework, sets of wheels associated with said framework, an axle for each of said sets of wheels, means associated with each of said axles for permitting a resilient movement of each of said wheels in a number of directions, a draw bar associated with said framework for permitting a pivotal movement with respect to one of said axles, duplicate pairs of tie rods and arms connected with said draw bar and said axles, whereby one set of said wheels may be moved in unison, and duplicate pairs of tie rods and arms connected with said draw bar and the axles of another of said sets of wheels whereby both of said sets may be operated in unison.

2. In a trailer, in combination, a framework, sets of front and rear wheels associated with said framework, a set of intermediate wheels also associated with said framework, means associated with said framework and each of said wheels for permitting a universal movement of said wheels with respect to said framework, and duplicate pairs of tie rods connected with the axles of said front and said intermediate wheels whereby they may be moved in unison.

3. In a trailer, in combination, a framework, a set of axles associated with said framework, wheels mounted for rotation on said axles, means associated with said axles and said framework whereby a universal movement may be permitted said wheels with respect to said framework, a draw bar, adjustable duplicate pairs of tie rods and arms whereby two of said axles may be moved in unison, and adjustable duplicate pairs of tie rods and arms connected to said last named axles and said draw bar whereby the wheels associated with each may be operated in unison.

4. In a trailer, in combination, a framework, a front axle, a pair of wheels mounted on said axle, means associated with said axle and said framework for permitting a universal movement of said wheels relative to said framework, a pair of rear axles, wheels mounted on said axles, a cross bar mounted on said framework and positioned between said rear axles, a plurality of pairs of leaf springs connected associated with said rear axles and said cross bar, and means associated with said resilient means and said axles whereby a universal movement between the wheels on said axles and said framework may be permitted.

5. In a six wheel trailer, in combination, a framework, a front axle, wheels on said axle, means associated with said framework and said axle for permitting a universal movement therebetween, a draw bar, means associated with said draw bar and said axle for permitting a pivotal movement of said wheels on said axle, a set of intermediate wheels and a set of rear wheels flexibly associated with each other and with said framework, and adjustable means associated with said first means and said intermediate means whereby said draw bar may turn said front wheels and said intermediate wheels in unison.

6. In a front wheel construction for a trailer, an axle flexibly associated with the framework of said trailer, a wheel pivotally mounted on each end of said axle, a cross bar on said framework, a draw bar mounted for pivotal movement on said cross bar and on said axle, a bent T plate on said draw bar and on said cross bar and duplicate pairs of tie rods and arms associated with said wheels and said draw bar whereby said wheels may be turned by said draw bar.

7. In a front wheel construction for a trailer, in combination, a cross bar on the framework of said trailer, an axle flexibly associated with said framework, a pair of wheels pivotally mounted on said axle, a draw bar, an offset T-shaped upper yoke pivotally mounted on said cross bar, and secured to said draw bar, a lower double and single armed offset yoke pivotally mounted on said axle, means associated with said lower yoke and said draw bar whereby both of said yokes may be turned in unison, and duplicate pairs of tie rods and arms associated with said wheels and said lower yoke whereby when said draw bar is turned, said wheels will move in unison therewith.

8. In a rear wheel construction for a trailer, in combination, a cross shaft secured to the framework of said trailer, a pair of axles flexibly associated with said shaft, a wheel on each end of each of said axles, a cross bar secured to said framework above the foremost of said axles, an upper yoke pivoted to said cross bar, a lower yoke pivoted to said foremost axle and movable in unison with said upper yoke, and duplicate pairs of tie rods and arms associated with the wheels on said foremost axle and said lower yoke whereby the wheels on said foremost axle may be turned with said yoke.

9. In a rear wheel construction for a trailer, a cross shaft, a pair of axles, sets of springs connecting said axles to said cross shaft, and sets of universal joints connecting each end of each of said springs to said axles, said joints each comprising a block equipped with a base, means for securing said base to said axle, a set of wear plates secured to said axle on each side thereof, a pair of hangers on each side of said axle, a top U-shaped member pivoted to said hangers and to said springs, and a lower U-shaped member pivoted to said hangers below said axle.

10. In a heavy duty trailer, in combination, a framework, front, intermediate, and rear anxles associated with said framework, a pivotal wheel journal mounted upon each end of each of said front and intermediate axles, wheels on each of said axles, a draw bar, an offset T-shaped plate mounted on said draw bar and said front axle, duplicate pairs of tie rods and arms connecting said plate to said pivotal journals, a second offset T-shaped plate mounted on said intermediate axle, a pair of tie rods connecting both of said plates, a third plate on said intermediate axle and adapted to move in unison with said second plate, and duplicate pairs of tie rods and arms connecting said third plate with said pivotal journals on said intermediate axle.

In testimony whereof I halve signed my name to this specification.

ALEXANDER E. STOCKFORD.